(12) United States Patent
Kikuchi

(10) Patent No.: US 9,467,245 B2
(45) Date of Patent: Oct. 11, 2016

(54) POLARIZATION MULTIPLEXING OPTICAL TRANSCEIVER

(71) Applicant: HITACHI, LTD., Tokyo (JP)

(72) Inventor: Nobuhiko Kikuchi, Tokyo (JP)

(73) Assignee: Hitachi, Ltd., Tokyo (JP)

(*) Notice: Subject to any disclaimer, the term of this patent is extended or adjusted under 35 U.S.C. 154(b) by 32 days.

(21) Appl. No.: 14/542,742

(22) Filed: Nov. 17, 2014

(65) Prior Publication Data

US 2015/0139649 A1 May 21, 2015

(30) Foreign Application Priority Data

Nov. 21, 2013 (JP) ................................. 2013-240849

(51) Int. Cl.
| | |
|---|---|
| H04J 14/06 | (2006.01) |
| H04B 10/40 | (2013.01) |
| H04B 10/077 | (2013.01) |
| H04B 10/50 | (2013.01) |
| H04B 10/61 | (2013.01) |

(52) U.S. Cl.
CPC ........... *H04J 14/06* (2013.01); *H04B 10/0779* (2013.01); *H04B 10/40* (2013.01); *H04B 10/5053* (2013.01); *H04B 10/616* (2013.01); *H04B 10/6166* (2013.01)

(58) Field of Classification Search
USPC ........................................................ 398/65
See application file for complete search history.

(56) References Cited

U.S. PATENT DOCUMENTS

| | | | |
|---|---|---|---|
| 8,660,425 B2 | 2/2014 | Aoki | |
| 2010/0329683 A1* | 12/2010 | Liu | H04B 10/2513 398/81 |
| 2011/0150498 A1* | 6/2011 | Meiman | H04B 10/2572 398/152 |
| 2011/0293266 A1 | 12/2011 | Aoki | |
| 2012/0008951 A1* | 1/2012 | Mikami | H04B 10/613 398/65 |
| 2013/0058642 A1 | 3/2013 | Bouda | |
| 2013/0336654 A1* | 12/2013 | Arikawa | H04B 10/614 398/65 |
| 2015/0188639 A1* | 7/2015 | Akashi | H04B 10/564 398/197 |

FOREIGN PATENT DOCUMENTS

| | | |
|---|---|---|
| JP | 2011-250291 A | 12/2011 |
| JP | 2013-055654 A | 3/2013 |

OTHER PUBLICATIONS

Winzer et al., "Spectrally Efficient Long-Haul Optical Networking Using 112-Gb/s Polarization-Multiplexed 16-QAM", Journal of Lightwave Technology, Feb. 15, 2010, pp. 547-556, vol. 28, No. 4.

* cited by examiner

*Primary Examiner* — David Payne
*Assistant Examiner* — Omar S Ismail
(74) *Attorney, Agent, or Firm* — Mattingly & Malur, PC

(57) ABSTRACT

It is provided a polarization multiplexing optical transceiver including a polarization multiplexing optical transceiver, a polarization multiplexing optical receiver, a transmission side polarization state control unit and a reception side polarization state control unit. The polarization multiplexing optical receiver includes: a polarization demultiplexing unit; a plurality of information signal reconstruction units configured to receive the reconstructed polarization component on the transmission side as an input, and reconstruct and extract information signals; and an information signal coupling unit configured to one of couple and select the information signals output by the plurality of information signal reconstruction units and output the resultant under control of the reception side polarization state control unit. The polarization multiplexing optical receiver is configured to control, in the single polarization reception state, the polarization demultiplexing unit and at least a part of the plurality of information signal reconstruction units to transition to a power saving mode.

13 Claims, 11 Drawing Sheets

RECEIVED DIGITAL SIGNAL 139 (S)

RECEIVED DIGITAL SIGNAL 138 (P)

RECEIVED DIGITAL SIGNAL 247 (Y)

RECEIVED DIGITAL SIGNAL 246 (X)

Y-POLARIZED DIGITAL SIGNAL 144

X-POLARIZED DIGITAL SIGNAL 145

DEFINITION OF AMPLITUDE r(n)
AND PHASE φ(n)

QUARTERNARY
PHASE SHIFT KEYING MODULATION
(QPSK)

16-LEVEL QUADRATURE
AMPLITUDE MODULATION
(16QAM)

ROTATION OF POLARIZATION MULTIPLEXING
AND POLARIZATION AXIS

POLARIZATION MULTIPLEXING OPTICAL TRANSCEIVER

CLAIM OF PRIORITY

The present application claims priority from Japanese patent application JP 2013-240849 filed on Nov. 21, 2013, the content of which is hereby incorporated by reference into this application.

BACKGROUND OF THE INVENTION

This invention relates to a polarization multiplexing optical transceiver to be used for an optical transmission system.

In ultrahigh-speed optical fiber transmission, in order to effectively use a wavelength range (or frequency range) usable for signal transmission, there is widely used wavelength multiplexing transmission configured to: transmit a plurality of optical signals different in wavelength in a bundle through an optical fiber; split the optical signals into original wavelengths at a receiving end; and to receive the optical signals by each optical receiver. As another method for using the frequency range more efficiently, use of polarization multiplexing transmission is under investigation.

Polarization multiplexing is a multiplexing method that utilizes a difference in polarization state of light. Two sets of optical signals modulated by independent information signals on a transmission side are converted into polarization states orthogonal to each other to be multiplexed, and then transmitted through the optical fiber. The polarization state of the optical signal can be represented as a point on a Poincare sphere. On an optical fiber transmission line, the polarization state of the optical signal is subjected to random conversion on the Poincare sphere, but the orthogonality of the polarization states is maintained. Thus, by performing conversion processing of the polarization state and polarization splitting on a receiving side, the two original multiplexed optical signals can be split, and information twice as much can be transmitted by using the same wavelength width.

In recent years, as a candidate of a large-capacity transmission method of 100 giga bits per second (Gb/s) or more in particular, attention is focused on a digital coherent polarization multiplexing transmission method for polarization-multiplexing a multilevel-modulated optical signal to transmit the signal, and polarization-splitting the optical signal to receive the signal by using a digital coherent reception technology. An example of such a method is "Spectrally Efficient Long-Haul Optical Networking Using 112-Gb/s Polarization-Multiplexed 16-QAM" by P. J. Winzer.

FIG. 12 is a diagram illustrating a configuration of a related-art polarization multiplexing optical transceiver 100. In each figure below, a path of parallel digital electric signals is indicated by a white arrow, a path of high-speed serial electric signals is indicated by a thin line, and a path of optical signals is indicated by a thick line.

The related-art polarization multiplexing optical transceiver 100 includes a pair of a related-art polarization multiplexing optical transceiver 101 and a related-art polarization multiplexing optical receiver 130, and is oppositely coupled to a polarization multiplexing optical transceiver of a similar type located at a place of several tens to several thousands of kilometers away via an optical fiber transmission line, thereby achieving long-distance optical fiber transmission.

In the related-art polarization multiplexing optical transceiver 101, a transmission laser beam 114 output from a transmission laser source 113 is split into two continuous wave (CW) laser beams 116-1 and 116-2 by an optical splitter 115, and respectively input to IQ optical field modulators 117-1 and 117-2. An IQ optical modulator (also referred to as IQ modulator) is an optical modulator that includes two sets of Mach-Zehnder (MZ) modulators arranged in parallel on a substrate of lithium niobate or the like. The IQ optical modulator can independently modulate an in-phase component (I component, real part) and a quadrature-phase component (Q component, imaginary part) of an optical field by applying a high-speed modulated voltage signal to a modulation signal input terminal of each MZ modulator.

In the example illustrated in FIG. 12, two high-speed serial signals output from two high-speed digital/analog (DA) converters 112-1 and 112-2 are input to the IQ optical field modulator 117-1. An optical signal having the former as a real part and the latter as an imaginary part is generated to be output as an X-polarized multilevel modulated optical signal 118. On the other hand, two high-speed serial signals output from two high-speed DA converters 112-3 and 112-4 are input to the IQ optical field modulator 117-2. An optical signal having the former as a real part and the latter as an imaginary part is generated to be output as a Y-polarized multilevel modulated optical signal 119.

The high-speed serial signal output from each DA converter corresponds to a real part or an imaginary part of a multilevel information signal. Accordingly, the X-polarized multilevel modulated optical signal 118 and the Y-polarized multilevel modulated optical signal 119 are independent multilevel modulation light beams modulated on a two-dimensional complex plane. The X-polarized multilevel modulated optical signal 118 and the Y-polarized multilevel modulated optical signal 119 are each input to a polarization multiplexer 122, and are output as a polarization multiplexing transmission optical signal 120 from a transmission light output fiber 121.

On the other hand, a transmission information signal 103 to be transmitted is first input to a related-art transmission side digital signal processing unit 102, and header information such as control information is added to the signal 103 by an internal framer 105. Then, the transmission information signal 103 is shaped to a standardized information frame of Optical Transport Network (OTN) 4 or the like. Almost the entire information frame is input to an error correction code generator 104, and error correction information is added thereto. Such information signals are interleaved to be split into an X-polarization information signal 106 and a Y-polarization information signal 107. X-polarization information and Y-theoretically information can be theoretically split for each frame. However, in order to reduce a delay and a circuit size, a method of splitting the information signals at regular intervals as in the case of odd/even bit or byte interleaving is employed.

The X-polarization and Y-polarization information signals 106 and 107 are respectively input to multilevel encoders 108-1 and 108-2, and assigned multilevel symbols for each plurality of bits to be converted into multilevel signal strings. Then, the X-polarization and Y-polarization information signals 106 and 107 are subjected to arithmetic processing (not shown) such as sampling rate conversion or interpolation. When necessary, the X-polarization and Y-polarization information signals 106 and 107 are input to digital pre-equalizing circuits 109-1 and 109-2 for compensating for an influence of transmission impairment such as chromatic dispersion of the optical fiber on the transmission side, and then respectively converted into X-polarization and Y-polarization digital output signals 110 and 111. Although not illustrated, when necessary, each digital output signal is subjected to processing such as linear/nonlinear response compensation at the optical modulator or a high frequency circuit. Then, a real part and an imaginary part of the X-polarization digital output signal 110 are respectively input to the DA converters 112-1 and 112-2, and a real part and an imaginary part of the Y-polarization digital output signal 111 are respectively input to the DA converters 112-3 and 112-4.

FIGS. 13A to 13D are diagrams illustrating a display method of the optical multilevel signal, a signal constellation of optical multilevel modulation, and polarization multiplexing transmission.

FIG. 13A shows a signal point on a complex plane (IQ plane). A modulation state of each multilevel signal can be represented by an optical field (strictly, equivalent low-frequency representation) at center timing (decision timing) of a modulation waveform. The signal point can be represented on complex Cartesian coordinates (IQ coordinates) or polar coordinates using an amplitude $r(n)$ and a phase $\Phi(n)$.

FIG. 13B shows a signal constellation of quarternary phase shift keying (QPSK) for transmitting two-bit information (00, 01, 11, 10) in one symbol by using four values ($\pi/4$, $3\pi/4$, $-3\pi/4$, $-\pi/4$) as phase angles $\Phi(n)$. A QPSK signal can be generated by, for example, inputting binary electric signals to two input terminals of an IQ optical field modulator 102-1, that is, an input terminal 103-1 for an in-phase component modulation signal and an input terminal 104-1 for a quadrature-phase component modulation signal, and modulating in-phase and quadrature-phase components (I) and (Q) to positive and negative two values. In polarization multiplexing 100 Gb transmission, quarternary phase shift keying is employed for each polarized optical signal. The rate of a binary electric signal is about 28 Gb/s. In the case of a quarternary phase shift keying signal generated by using this signal, two-bit information can be transmitted in one symbol, and thus the transmission rate is 56 Gb/s.

FIG. 13C shows a signal constellation of sixteen-level quadrature amplitude modulation (16QAM) in which information transmission efficiency is higher. In 16QAM, signal points are arranged in a grid-like pattern, and four-bit information can be transmitted in one symbol. In the shown example, upper two-bit values (10xx, 11xx, 01xx, 00xx) are represented on coordinates of a Q axis, and lower two-bit values (xx10, xx11, xx01, xx00) are represented on coordinates of an I axis. Such multilevel signals can be generated by respectively inputting multilevel electric signals (four-level in this example) to the two input terminals I and Q of the IQ optical field modulator 117 illustrated in FIG. 12, and inputting voltage components corresponding to field coordinates (i(t), q(t)) of in-phase and quadrature-phase components.

FIG. 13D shows a concept of polarization multiplexing. A light wave is a kind of electromagnetic wave, and there are two independent orthogonal polarization states (e.g., horizontal polarization and vertical polarization) depending on field vibration directions with respect to a traveling direction. Thus, two optical field components (X-polarization and Y-polarization components in FIG. 13D) can be modulated by separate information signals, and multiplexed to be transmitted. In the above-mentioned 100 Gb transmission, quarternary phase shift keying signals of 56 Gb/s independent of each other are multiplexed on the X-polarization and Y-polarization components to be transmitted, and accordingly a total transmission speed is 112 Gb/s. The transmission speed exceeds 100 Gb/s because of an increase of data caused by encoding and addition of error correction information, and different values may be set depending on methods.

In FIG. 12, as described above, the polarization multiplexed transmission optical signal 120 is transmitted for a long distance through the optical fiber transmission line of several tens to several thousands of kilometers, and subjected to transmission impairment or arbitrary polarization rotation in the midway due to chromatic dispersion or a nonlinear effect of the optical fiber. The polarization multiplexing optical receiver 130 of the related-art polarization multiplexing optical transceiver on the opposite side receives the transmitted optical signal 120. This polarization multiplexing optical receiver 130 uses coherent detection, and utilizes, as a detection reference of a field component of a received polarization multiplexed signal 133 input from a received light input fiber 132, a local laser beam 135 emitted from a local laser source 134 disposed in the receiver.

The received polarization multiplexed signal 133 is input together with the local laser beam 135 to a polarization-diversity optical 90-degree hybrid front end 136. The front end 136 subjects both optical signals to polarization/phase diversity detection, and outputs four resultant serial electric signals (Is: in-phase component of S-polarization component, Qs: quadrature-phase component of S-polarization component, Ip: in-phase component of P-polarization component, and Qp: quadrature-phase component of P-polarization component). S and P are polarization main axes of the receiver. Those high-speed serial signals are respectively sampled by analog/digital (AD) converters 137-1 to 137-4, converted into an S-polarization received digital signal 138 and a P-polarization received digital signal 139, and input to a reception side digital signal processing unit 131.

In the reception side digital signal processing unit 131, the S-polarization and P-polarization received digital signals 138 and 139 are respectively input to transmission impairment compensators 140-1 and 140-2. The transmission impairment compensators 140-1 and 140-2 mainly compensate for the influence of the chromatic dispersion of the transmission line, and output equalized S-polarization and P-polarization digital signals 141 and 142. In FIG. 12, the two transmission impairment compensators 140-1 and 140-2 are illustrated as independent circuits, which is a configuration that takes no consideration for interaction of both polarization components. When nonlinear interaction such as inter-polarization mutual phase modulation is compensated for, both may be configured to be integral.

Then, the equalized S-polarization and P-polarization digital signals 141 and 142 are input to a polarization demultiplexing unit 143. As described above, the polarization of the received polarization multiplexed signal 133 is rotated in the midway of the transmission line, and hence the polarization main axes S and P on the reception side do not match those on the transmission side. The polarization demultiplexing unit 143 calculates polarization rotation, and based on a result of the calculation, restores/splits X-polarization and Y-polarization digital signals 145 and 144 that are polarization components on the transmission side.

For the polarization demultiplexing unit 143, an adaptive butterfly finite impulse response (FIR) filter, which is a ladder filter with a time domain or a frequency domain of several to several tens of taps, can be used. For example, the polarization demultiplexing unit 143 includes four sets of complex FIR filters, and is configured to couple two polarization components of an input and an output in a butterfly pattern. The polarization demultiplexing unit 143 adaptively controls a tap coefficient based on an algorithm such as a constant modulus algorithm (CMA), thereby adaptively splitting the polarization components and equalizing waveforms.

The X-polarization and Y-polarization digital signals 145 and 144 output from the polarization demultiplexing unit 143 are respectively input to frequency offset estimation circuits 146-2 and 146-1. The frequency offset estimation circuits 146-2 and 146-1 and phase estimation circuits 147-2 and 147-1 correct a frequency difference (frequency offset) between the local laser source and a transmission laser source, and input signals having corrected signal phase shifting (rotational shifting on complex plane) to multilevel decision circuits 148-2 and 148-1.

The multilevel decision circuit 148-1 restores an original Y-polarization information signal 149, and the multilevel decision circuit 148-2 restores an original X-polarization information signal 150. Those information signals are interleave-multiplexed again, and then input to an error correction circuit 152. The error correction circuit 152 and a frame removing circuit 151 detect a head of a data frame, correct an error, remove an error code and a header, and restore a received information signal 153 to be output.

In such polarization multiplexing transmission, the two types of polarization X and Y can be used as independent transmission/reception media. Thus, when the amount of information to be transmitted is small, power consumption may be reduced by stopping the polarization multiplexing transmission to transmit information in a single polarization state. As a technology for achieving power saving, a technology disclosed in JP 2011-250291 A is known. An optical transmitter capable of switching between a polarization multiplexing state and a single polarization state, which is disclosed in JP 2011-250291 A illustrated in FIG. 3, reduces power consumption by cutting off power of a polarization multiplexing encoder and a modulator during single polarization. An optical receiver 30 of JP 2011-250291 A illustrated in FIG. 10 stops some circuits.

In JP 2013-055654 A, there are disclosed a method of reducing power consumption by switching a multilevel polarization multiplexed signal to a single polarization multilevel signal capable of transmitting twice as many bits and a method of shutting down at least one of a driver or a signal processor in a transmitter for dual polarization modulation. In JP 2013-055654 A, there is also disclosed a method of reducing power consumption by controlling a receiver to shut down a component for receiving and processing a signal relating to a polarization component in which no information is modulated, for example, by controlling the receiver to stop an operation of digital signal processing (DSP) for processing a main polarized signal carrying no information.

SUMMARY OF THE INVENTION

Problems of the related-art configuration to be solved are as follows.

In the above-mentioned related art, sufficient consideration is not given to the method for reducing power consumption and effects thereof. As a result, there is a first problem in that power consumption cannot be effectively reduced.

Therefore, there is a demand to effectively reduce power consumption. In the related-art coherent transceiver, power consumption of the digital signal processing unit is large (power consumption is several tens of watts (W) by 100 Gbps class), and a major part thereof includes four circuits, namely, the error correction circuit 152 illustrated in FIG. 12, the polarization demultiplexing unit 143 on the reception side illustrated in FIG. 12, the dispersion compensators 140-1 and 140-2 on the reception side illustrated in FIG. 12, and the digital pre-equalizing circuits 109-1 and 109-2 on the transmission side illustrated in FIG. 12. When the error correction circuit repeats a logical operation to improve error correction performance and thereby increases an encoding gain, the transmission distance can be extended. Turbo encoding or a soft-decision error correction circuit, which has increasingly been employed in recent years, is high in correction performance but large in size, and power consumption may be one several tenth of total power consumption. In general, however, an information signal to be transmitted is automatically interleaved between an X-polarization component and a Y-polarization component to be arranged. As a result, it is difficult to arbitrarily stop one of the error correction circuits for the X-component and Y-polarization components.

The polarization demultiplexing unit 143 on the reception side is also configured with use of a multistage butterfly ladder filter, and thus an operation amount and power consumption are large. In the above-mentioned related-art literatures, there is no suggestion on the necessity of reducing the power consumption of the polarization demultiplexing unit nor the configuration for reducing the power consumption of the polarization demultiplexing unit.

The dispersion compensators 140-1 and 140-2 on the reception side are arranged immediately before the polarization demultiplexing unit, and configured to compensate for dispersion of the polarization main axis components S and P before polarization splitting. The X-polarization and Y-polarization components on the transmission side are mixed in the S and P components. As a result, even when switched to single polarization transmission using only the X-polarization component on the transmission side, none of the dispersion compensators 140-1 and 140-2 on the reception side can be stopped in operation, and power consumption cannot be reduced. No study has hitherto been conducted on effectiveness of power consumption reduction, and the above-mentioned related-art literatures do not mention any effective power saving method for the actual digital coherent transceiver.

The digital pre-equalizing circuits 109-1 and 109-2 on the transmission side may not be used in many cases. It is because similar effects are acquired by the dispersion compensators 140-1 and 140-2 on the reception side. However, the use of a pre-equalizing technology enables improvement of resistance to the optical fiber nonlinear effect, thereby extending a transmission distance. In any of the above-mentioned related-art literatures, there is no mention of power consumption reduction for this part.

On the other hand, in JP 2011-250291 A and JP 2013-055654 A, there is disclosed a configuration of reducing power consumption at the polarization multiplexing encoder, the modulator, and the signal processor on the transmission side. However, power consumption reducing effects are small at all the circuits. On the receiver side, it is suggested to stop a part of the receiver or the operation for processing the main polarized signal carrying no information. However, the actual receiver is not configured to simply stop the operation of the error correction circuit, the polarization demultiplexing unit, or the reception side dispersion compensator having high power consumption.

Therefore, in regard to the high power consumption portions of the polarization multiplexing transceiver, in particular, the error correction circuit in the receiver, the polarization demultiplexing unit, the reception side dispersion compensator, and the transmission side digital pre-equalizing circuit, there is a demand to increase power consumption effects with use of a configuration capable of switching between single polarization transmission and polarization multiplexing transmission.

A second problem is that a study needs to be carried out on an intensity change of the optical signal during switching between the polarization multiplexing transmission and the single polarization transmission. In general, when the modulation on one side is stopped, optical intensity of a polarization component on the stopped side is unstable. In the midway of the transmission line, there are installed an optical amplifier for keeping optical channel intensity constant, a wavelength selection switch, an optical amplifier, an optical attenuator, and the like. The changed optical intensity may cause a change in SN ratio of the signal and a change in degradation amount due to the optical fiber nonlinear effect, with the result that signal degradation may occur after switching. Such a phenomenon has not been hitherto pointed out, and any countermeasures have not been considered.

Therefore, there is a demand to execute control to prevent the intensity change of the optical signal from affecting transmission characteristics of the optical signal during the switching between the polarization multiplexing transmission and the single polarization transmission.

A third problem is that no study has been conducted on changing of a polarization state based on the amount of information to be transmitted, and there is no method involving transition or automatic switching of the polarization state.

Therefore, there is a demand for a method with high practical added value for state transition and automatic switching between the polarization multiplexing transmission and the single polarization transmission.

The representative one of inventions disclosed in this application is outlined as follows. There is provided a polarization multiplexing optical transceiver configured to transmit/receive polarization multiplexed light in which each of polarization components orthogonal to each other has been modulated by an independent multilevel information signal, the polarization multiplexing optical transceiver comprising: a polarization multiplexing optical transceiver configured to transmit the polarization multiplexed light; a polarization multiplexing optical receiver configured to receive the polarization multiplexed light; and a transmission side polarization state control unit and a reception side polarization state control unit that are configured to operate independently of each other. The transmission side polarization state control unit is configured to switch, for the polarization multiplexed light to be transmitted by the polarization multiplexing optical transceiver, the polarization multiplexing optical transceiver to one of a polarization multiplexing transmission state in which both polarized optical signals have been modulated by an information signal and a single polarization transmission state in which only one of the polarized optical signals has been modulated by the information signal. The reception side polarization state control unit is configured to switch, for an optical multilevel modulated signal to be received by the polarization multiplexing optical receiver, the polarization multiplexing optical receiver to one of a polarization multiplexing reception state in which both polarized optical signals have been modulated by an information signal and a single polarization reception state in which only one of the polarized optical signals has been modulated by the information signal. The polarization multiplexing optical receiver includes: a polarization demultiplexing unit configured to reconstruct a polarization component on the transmission side; a plurality of information signal reconstruction units configured to receive the reconstructed polarization component on the transmission side as an input, and reconstruct and extract information signals; and an information signal coupling unit configured to one of couple and select the information signals output by the plurality of information signal reconstruction units and output the resultant under control of the reception side polarization state control unit. The polarization multiplexing optical receiver is configured to control, in the single polarization reception state, the polarization demultiplexing unit and at least a part of the plurality of information signal reconstruction units to transition to a power saving mode.

According to the exemplary embodiment of this invention, in the single polarization state, the circuit having large power consumption can be switched to the power saving mode, thereby reducing power consumption. Other features, configurations, and effects become apparent from the following description of the embodiments.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Figure 1:
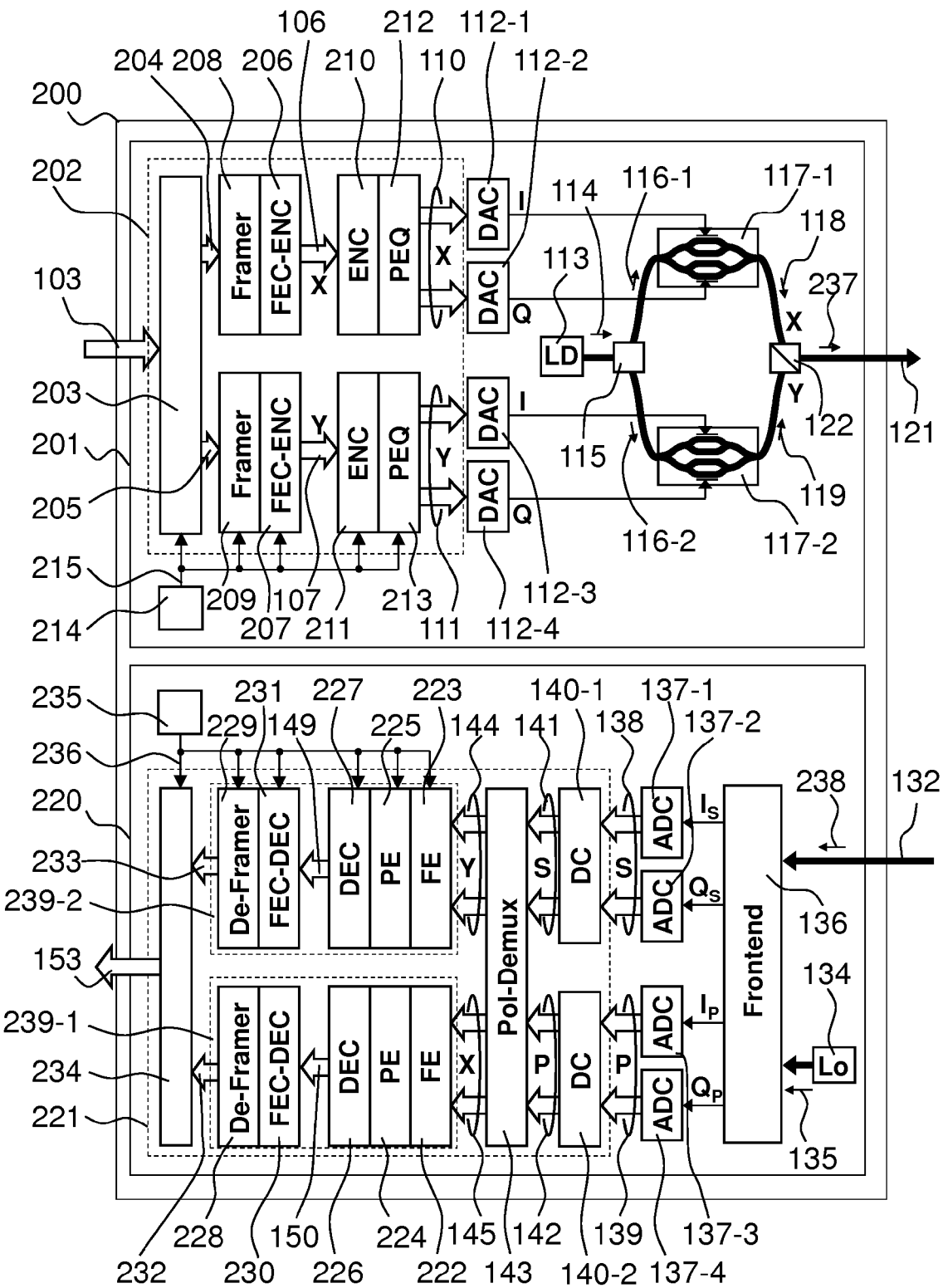
FIG. 1 is a diagram illustrating a configuration of a polarization multiplexing optical transceiver according to a first embodiment of this invention.

Now, embodiments of this invention are described referring to the drawings.

<First Embodiment>

FIG. 1 is a diagram illustrating a configuration of a polarization multiplexing optical transceiver 200 according to a first embodiment of this invention.

In the first embodiment, a transmission side polarization state control unit 214 is first disposed in a polarization multiplexing optical transceiver 201 of this invention, and a reception side polarization state control unit 235 is further disposed in a polarization multiplexing optical receiver 220 of this invention. The polarization multiplexing optical transceiver 201 and the polarization multiplexing optical receiver 220 can independently select two operation states, namely, a polarization multiplexing state and a single polarization state.

In the configuration according to this embodiment, a transmission information signal 103 is input to an information signal splitter 203 disposed in a transmission side digital signal processing unit 202. A transmission side polarization state control signal 215 output from the transmission side polarization state control unit 214 is input to the information signal splitter 203. The transmission information signal 103 is output only as an X-polarization transmission information signal 204 in the single polarization state, and split into the X-polarization transmission information signal 204 and a Y-polarization transmission information signal 205 to be output in the polarization multiplexing state.

There are some variations of signal splitting methods. This embodiment is described by way of example where the information signal splitter 203 splits the signal by an independent information unit such as a port or an input packet, and the X-polarization and Y-polarization signals are processed as independent transmission channels. In this case, the X-polarization and Y-polarization components can be independently subjected to framing or error correction, and the polarization multiplexing state can be switched without considering each other's timing or state.

Thereafter, the X-polarization transmission information signal 204 is converted into an X-polarization output digital signal 110 by an X-polarization framer 208, an X-polarization error correction code generator 206, an X-polarization multilevel encoder 210, and an X-polarization pre-equalizing circuit 212 to be X-polarization multilevel modulation light 118. On the other hand, the Y-polarization transmission information signal 205 is input to a Y-polarization power saving framer 209, a Y-polarization power saving error correction code generator 207, a Y-polarization power saving encoder 211, and a Y-polarization power saving pre-equalizing circuit 213, and subjected to signal processing completely independent of the X-polarization signal.

The transmission side polarization state control signal 215 is input to the Y-polarization power saving framer 209, the Y-polarization power saving encoder 211, and the Y-polarization power saving pre-equalizing circuit 213. Those Y-polarization power saving circuits have functions of transitioning to a power saving mode to reduce power consumption by a method such as cutting off of power inside, achieving of a low voltage, or stopping of an internal clock in accordance with the transmission side polarization state control signal 215. As a result, in a transmission side single polarization mode, those Y-polarization power saving circuits can reduce power consumption of the transmission side digital signal processing unit 202 up to 50% by transitioning to the power saving mode.

There is no need to provide the power saving mode to all the transmission side signal processors. The power saving mode only needs to be provided to a circuit having relatively large power consumption. Though not illustrated in the configuration, the transmission side polarization state control signal 215 may also be input to subsequent digital/analog converter (DAC) circuits 112-3 and 112-4 and a high-frequency amplifier circuit and a driver circuit arranged on an output path of those digital/analog converter circuits so that those circuits transition to a power saving mode.

With the above-mentioned configuration, an information signal of a Y-polarization component is converted into CW light in the single polarization mode, and into conventional Y-polarized multilevel modulation light 119 in the polarization multiplexing mode. As a result, an output optical signal 237 output from a transmission light output fiber 121 can be switched to single polarized light or polarization multiplexed light.

Figure 12:
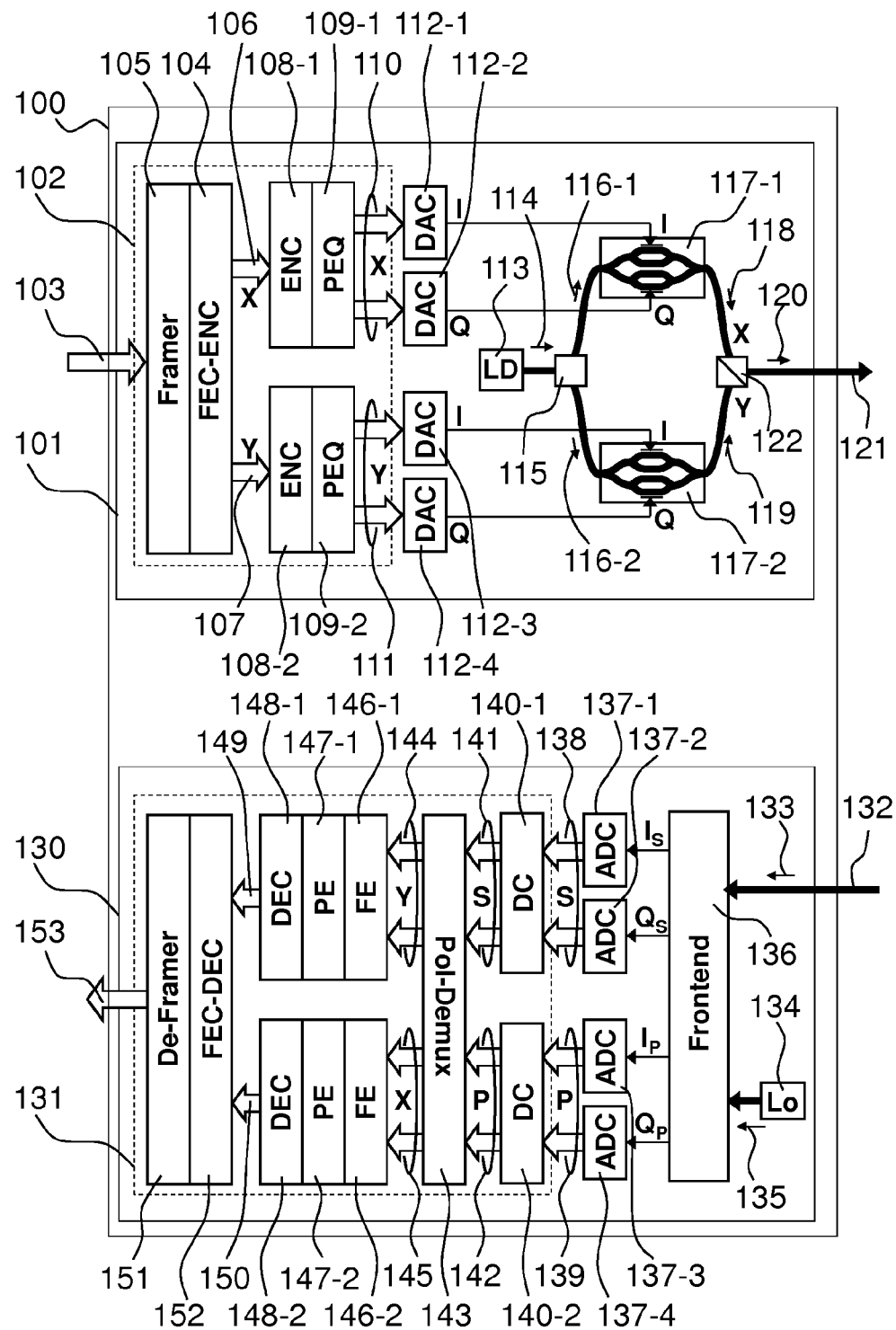
FIG. 12 is a diagram illustrating a configuration of a related-art polarization multiplexing optical transceiver.
Figure 13A:
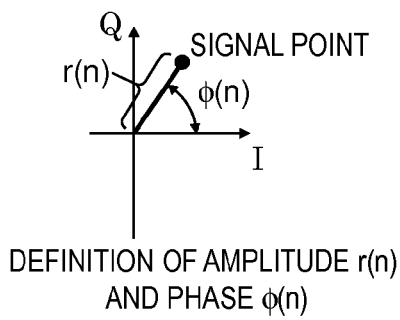
FIGS. 13A to 13D are diagrams illustrating a display method of the optical multilevel signal, a signal constellation of optical multilevel modulation, and polarization multiplexing transmission.
Figure 13B:
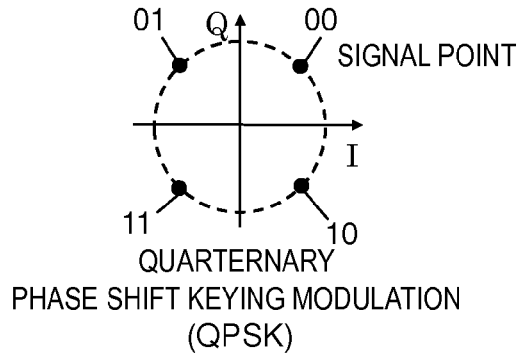
Figure 13C:
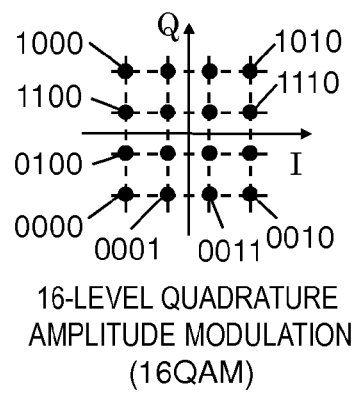
Figure 13D:
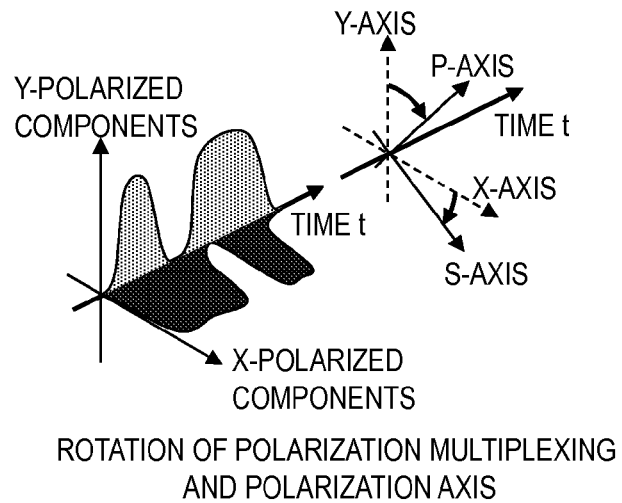

In the polarization multiplexing optical receiver 220 of this invention, a received optical signal 238 input from a received light input fiber 132 is input to a polarization-diversity optical 90-degree hybrid front end 136 to execute coherent polarization diversity reception. In this configuration, a former half structure of the polarization multiplexing optical receiver 220 from a reception front end through AD converters 137-1 to 137-4 and transmission impairment compensators 140-1 and 140-2 to a polarization demultiplexing unit 143 is the same as that of the related-art polarization multiplexing optical receiver 130 illustrated in FIG. 12.

The received optical signal 238 is subjected to arbitrary polarization rotation during transmission on the optical fiber transmission line. Therefore, a polarization state thereof is generally different from polarization main axes S and P of the polarization-diversity optical 90-degree hybrid front end 136, and X-polarization and Y-polarization components of the transmission side are mixed in S-polarization and P-polarization components output from the polarization-diversity optical 90-degree hybrid front end 136. Thus, even when the received optical signal 238 is a single polarized signal (only X-polarization component), large transmission impairment may occur unless both S-polarization and P-polarization components are received.

Then, an X-polarization digital signal 145 output from the polarization demultiplexing unit 143 is passed through an X-polarization information signal reconstruction circuit 239-1, specifically, an X-polarization frequency offset estimation circuit 222/X-polarization phase estimation circuit 224, an X-polarization multilevel decision circuit 226, an X-polarization error correction circuit 230, and an X-polarization frame removing circuit 228, and then input as an X-polarization received information signal 232 to an information signal coupling unit 234.

A Y-polarization digital signal 144 output from the same polarization demultiplexing unit 143 is passed through a Y-polarization information signal reconstruction circuit 239-2, specifically, a power saving frequency offset estimation circuit 223, a Y-polarization power saving phase estimation circuit 225, a Y-polarization power saving multilevel decision circuit 227, a Y-polarization power saving error correction circuit 231, and a Y-polarization power saving frame removing circuit 229, and then input as a Y-polarization received information signal 233 to the information signal coupling unit 234. The circuits from the transmission impairment compensators 140-1 and 140-2 to the information signal coupling unit 234 constitute a reception side digital signal processing unit 221.

A reception side polarization state control signal 236 is output from the reception side polarization state control unit 235, and input to each circuit of the Y-polarization information signal reconstruction circuit 239-2 and the information signal coupling unit 234. As in the case of the transmission side, each power saving circuit of the Y-polarization side has a function of reducing power consumption by transitioning to a power saving mode in accordance with a state of the reception side polarization state control signal 236. In a reception side single polarization mode, power consumption of the reception side digital signal processing unit 221 can be reduced by up to 50%.

The information signal coupling unit 234 outputs, in accordance with the state of the reception side polarization state control signal 236, only the X-polarization received information signal 232 as a received information signal 153 in the reception side single polarization state. In the reception side polarization multiplexing mode, the information signal coupling unit 234 couples the X-polarization and Y-polarization received information signal 232 and 233 to output a resultant signal by a method opposite to that for splitting on the transmission side. In the configuration according to this embodiment, the X-polarization and Y-polarization components are independently subjected to decoding, error correction, and frame removing processing also on the reception side, and both constitute independent transmission channels. As a result, ON/OFF switching of the Y-polarization component can be performed independently of the X-polarization component.

As in the case of the transmission side, there is no need to provide the power saving mode to all the circuits in the above-mentioned Y-polarization information signal reconstruction circuit 239-2. In this embodiment, as represented by the Y-polarization power saving error correction circuit 231, only a circuit having relatively large power consumption needs to be provided with a function of transitioning to the power saving mode.

In this embodiment, the example where the X-polarization and Y-polarization signals are processed as the independent transmission channels is described above. However, all such signals can be processed as one channel. In this case, the X-polarization framer 208 and the Y-polarization power saving framer 209 are integrated, and the X-polarization error correction code generator 206 and the Y-polarization power saving error correction code generator 207 are integrated to be arranged immediately before the information signal splitter 203. Then, integrated framing and error correction code generation may be carried out on the information signals of both paths. In the single polarization state, the framer and the error correction circuit need to be changed in operation so as to generate an appropriate frame or an error correction code even when a transmission rate is halved.

In this embodiment, the configuration of the polarization multiplexing optical transceiver using the coherent polarization diversity detection is described above. The technology of this invention can be applied to a polarization multiplexing optical transceiver that includes a polarization diversity receiver for executing polarization splitting processing by digital signal processing. For example, this invention can be applied to a polarization multiplexing optical receiver of an intensity modulation/intensity reception type that executes polarization splitting by using a digital multiple-input and multiple-output (MIMO) operation, and a polarization multiplexing optical multilevel receiver that uses optical delay detection and executes polarization splitting processing by using a digital polarization rotation operation.

As described above, according to the first embodiment, in the polarization multiplexing optical transceiver configured to switch the state between the polarization multiplexing state and the single polarization state, the circuit having large power consumption (e.g., error correction circuit, polarization demultiplexing unit, reception side dispersion compensator, or transmission side digital pre-equalizing circuit) in the receiver is switched to the power saving mode in the single polarization state, thereby reducing power consumption, which has been difficult to be achieved in the related-art configuration.

The polarization demultiplexing unit, the information signal reconstruction circuit, and the information signal coupling circuit are configured by using the digital circuits. Thus, those circuits can be mounted in a compact manner, and power ON/OFF can be easily controlled.

<Second Embodiment>

Figure 2:
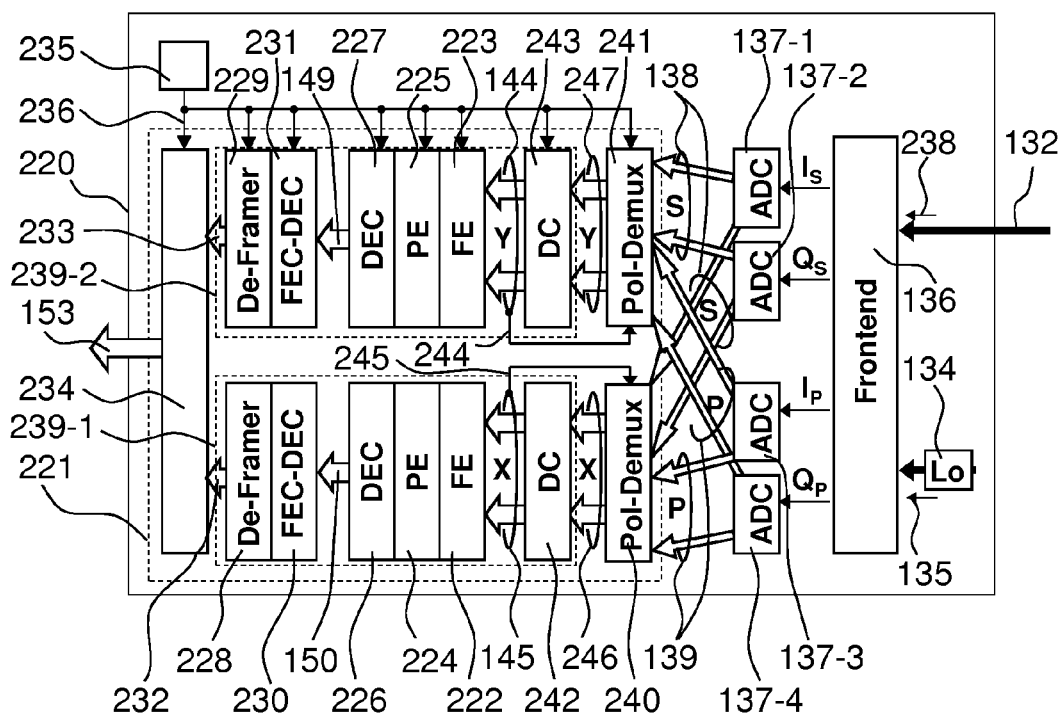
FIG. 2 is a diagram illustrating a configuration of a polarization multiplexing optical receiver according to a second embodiment of this invention.

FIG. 2 is a diagram illustrating a configuration of a polarization multiplexing optical receiver according to a second embodiment of this invention. In the second embodiment, a polarization demultiplexing unit and a transmission impairment compensator having large power consumption are configured to be switched to a power saving mode on a reception side.

In this embodiment, a polarization demultiplexing unit in an X-polarization side 240 and a Y-polarization power saving polarization demultiplexing unit 241 are configured by independent circuits. X-polarization and Y-polarization received digital signals 246 and 247 output from the respective polarization demultiplexing units are respectively input to an X-polarization transmission impairment compensator 242 and a Y-polarization power saving transmission impairment compensator 243. A reception side polarization state control signal 236 is input to the Y-polarization power saving polarization demultiplexing unit 241 and the Y-polarization power saving transmission impairment compensator 243. Those two circuits are configured to be switched to a power saving mode in a reception side single polarization state.

As described above, in the receiver, a circuit located on an entrance side of the polarization demultiplexing unit cannot stop an operation even in a single polarization mode because of the need to process a signal in which X-polarization and Y-polarization components are mixed. However, in the case of an example of the transmission impairment compensator according to this embodiment, a signal moves to an output side of the polarization demultiplexing unit for splitting and reconstructing polarization (X-polarization and Y-polarization components) of a transmission side, and thus processing can transition to a power saving mode for stopping an operation of a circuit of a side (Y-polarization side in this embodiment) where no signal is present in the single polarization state.

However, the transmission impairment compensator generally having a function of compensating for large transmission impairment and rectifying a waveform needs to be disposed on the entrance side of the polarization demultiplexing unit, and an arrangement employed in this embodiment is difficult.

FIGS. 3A to 3F are diagrams each a diagram illustrating a signal constellation according to the second embodiment of this invention.

Figure 3A:
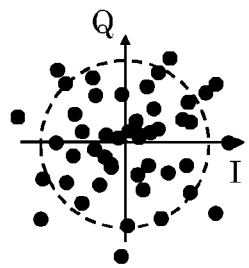
FIGS. 3A to 3F are diagrams each illustrating signal constellation according to the second embodiment of this invention.
Figure 3B:
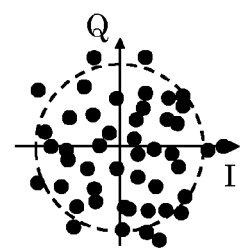

FIG. 3A shows a signal constellation of an S-polarization received digital signal 139 input to the polarization demultiplexing unit. FIG. 3B shows a signal constellation of a P-polarization received digital signal 138 input to the polarization demultiplexing unit. The signal constellations are greatly disturbed in both.

Figure 3C:
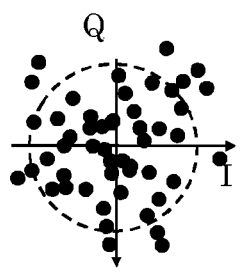
Figure 3D:
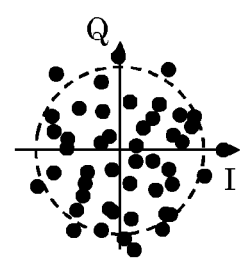

FIG. 3C shows a signal constellation of an X-polarization received digital signal 247 after polarization splitting. FIG. 3D shows a signal constellation of a Y-polarization received digital signal 246 after polarization splitting.

In the configuration of this embodiment, transmission impairment is not equalized, and thus a signal cannot be identified even after the polarization splitting. On the other hand, to carry out an adaptive operation for sequentially following polarization fluctuation of the transmission line, the polarization demultiplexing unit executes adaptive feedback control targeting a state where its own output waveform is an ideal multilevel received waveform having no waveform distortion. Thus, when an order of the polarization demultiplexing unit and the transmission impairment compensator is simply reversed to dispose the transmission impairment compensator 242 on the output side of the polarization demultiplexing unit in an X-polarization side 240 (or transmission impairment compensator 243 on output side of polarization demultiplexing unit 241) as illustrated in FIG. 2, immediately after the polarization demultiplexing units 240 and 241, large waveform distortions like those shown in FIGS. 3C and 3D remain, and consequently the polarization demultiplexing units do not operate any more.

To solve the above-mentioned problem, this embodiment employs a configuration where Y-polarization and X-polarization digital signals 144 and 145 that are outputs of the Y-polarization power saving transmission impairment compensator 243 and the X-polarization transmission impairment compensator 242 are extracted, and respectively fed back as Y-polarization and X-polarization feedback signals 244 and 245 to the Y-polarization power saving polarization demultiplexing unit 241 and the X-polarization polarization demultiplexing unit 240.

Figure 3E:
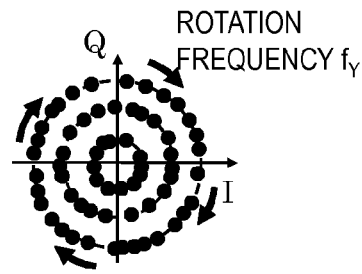
Figure 3F:
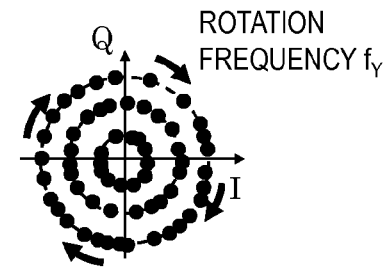

FIG. 3E shows a signal constellation of the Y-polarization digital signal 144 after transmission impairment compensation. FIG. 3F shows a signal constellation of the X-polarization digital signal 145 after transmission impairment compensation. The compensation for waveform degradation such as chromatic dispersion enables clear observation of a signal amplitude distribution, and optimization of a FIR filter using an algorithm such as CMA.

Figure 4:
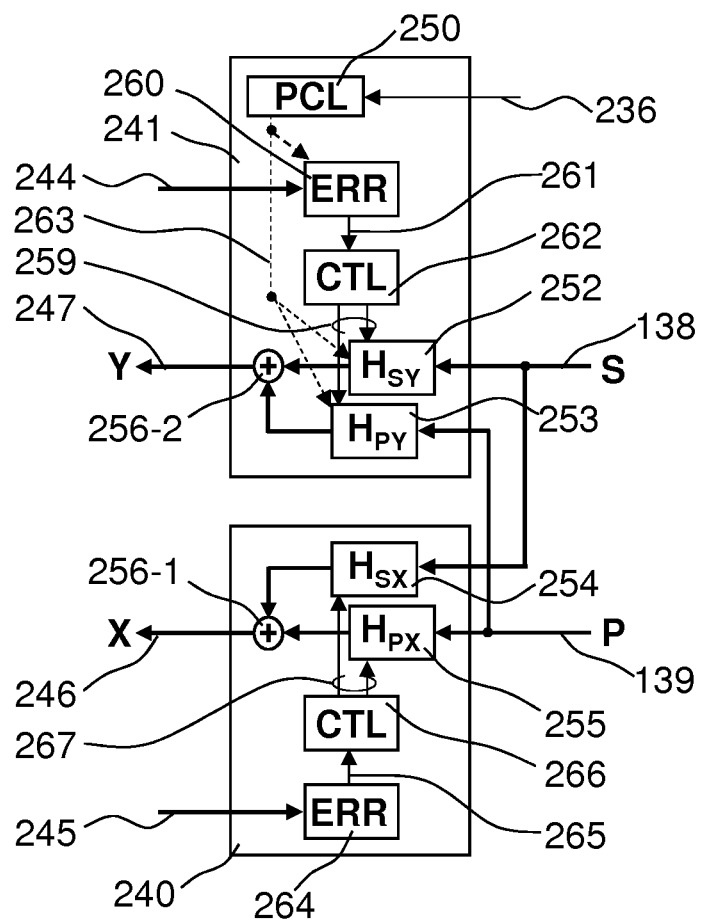
FIG. 4 is a diagram illustrating a detailed internal configuration of the polarization demultiplexing unit according to the second embodiment of this invention.

FIG. 4 is a diagram illustrating a detailed internal configuration of the polarization demultiplexing unit according to the second embodiment of this invention illustrated in FIG. 2.

In this embodiment, the S-polarization and P-polarization received digital signals 138 and 139 are input to the X-polarization polarization demultiplexing unit 240 and the Y-polarization power saving polarization demultiplexing unit 241. The polarization demultiplexing unit in an X-polarization side 240 and the Y-polarization power saving polarization demultiplexing unit 241 operate independently of each other. The polarization demultiplexing unit in an X-polarization side 240 extracts the X-polarization received digital signal 246, and the Y-polarization power saving polarization demultiplexing unit 241 extracts the Y-polarization received digital signal 247.

In other words, the polarization demultiplexing unit in an X-polarization side 240 includes complex FIR filters 254 and 255. The complex FIR filter 254 is an N tap complex FIR filter to which the S-polarization received digital signal 138 is input, and input polarization is S while output polarization is X. The complex FIR filter 255 is an N tap complex FIR filter to which the P-polarization received digital signal 139 is input, and input polarization is P while output polarization is X. A result of a product-sum operation of outputs of the complex FIR filters 254 and 255 is added by an adder 256-1, thus constituting a butterfly operation circuit for extracting an X-polarization component.

Similarly, the Y-polarization power saving polarization demultiplexing unit 241 includes power saving complex FIR filters 252 and 253. The power saving complex FIR filter 252 is an N tap power saving complex FIR filter to which the S-polarization received digital signal 138 is input, and input polarization is S while output polarization is Y. The power saving complex FIR filter 253 is an N tap power saving complex FIR filter to which the P-polarization received digital signal 139 is input, and input polarization is P while output polarization is Y. A result of a product-sum operation of outputs of the power saving complex FIR filters 252 and 253 is added by an adder 256-2, thus constituting a butterfly operation circuit for extracting a Y-polarization component.

To adaptively control a FIR filter tap, on the X-polarization side, a part of the X-polarization digital signal 145 extracted immediately after the X-polarization transmission impairment compensator 242 of FIG. 2 is input as an X-polarization feedback signal 245 to an X-polarization error calculation circuit 264. The X-polarization error calculation circuit 264 calculates an X-polarization error signal 265 by using an operation algorithm such as CMA or least mean squares (LMS), and inputs the X-polarization error signal 265 to an X-polarization tap control circuit 266. The X-polarization tap control circuit 266 calculates an X-polarization tap control signal 267 from the input X-polarization error signal 265 to automatically optimize the N tap complex FIR filters 254 and 255.

Similarly, for the Y-polarization component, a part of the Y-polarization digital signal 144 extracted immediately after the Y-polarization power saving transmission impairment compensator 243 of FIG. 2 is input as a Y-polarization feedback signal 244 to a Y-polarization error calculation circuit 260. The Y-polarization error calculation circuit 260 calculates a Y-polarization error signal 261 by using an algorithm similar to that of the X-polarization component, and inputs the Y-polarization error signal 261 to a Y-polarization tap control circuit 262. The Y-polarization tap control circuit 262 calculates a Y-polarization tap control signal 263 from the input Y-polarization error signal 261 to automatically optimize the N tap power saving complex FIR filters 252 and 253.

The Y-polarization power saving polarization demultiplexing unit 241 includes a power control circuit 250. The power control circuit 250 outputs a power control signal 251 in accordance with a reception side polarization state control signal 236 input from the outside. In the reception side single polarization state not using any Y-polarization component, by the electric control signal 251, the Y-polarization error calculation circuit 260 and the N tap power saving complex FIR filters 252 and 253 arranged in the power control circuit 250 can transition to the power saving mode.

As described above, according to the second embodiment, the power consumption of the transmission impairment compensator having large power consumption can be reduced.

By the feedback controls 244 and 245, characteristics of the Y-polarization power saving polarization demultiplexing unit 241 and the X-polarization polarization demultiplexing unit 240 can be automatically optimized.

<Third Embodiment>

Figure 5:
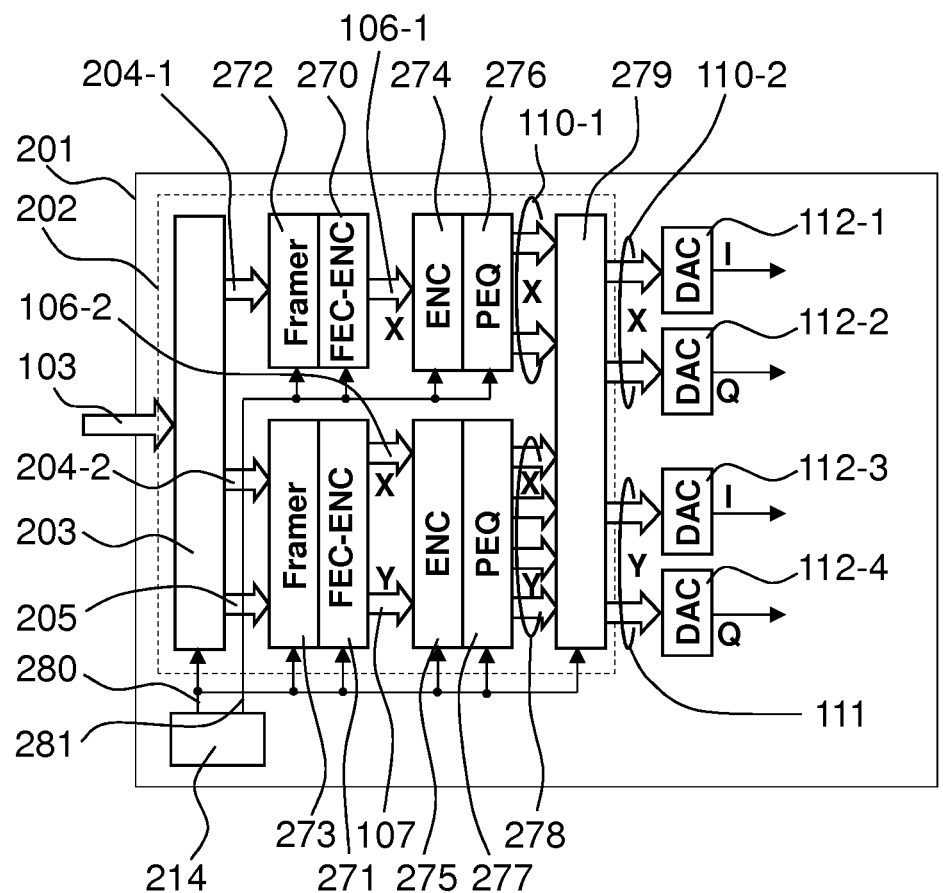
FIG. 5 is a diagram illustrating a configuration of a polarization multiplexing optical transmitter according to a third embodiment of this invention.

FIG. 5 is a diagram illustrating a configuration of a polarization multiplexing optical transmitter according to a third embodiment of this invention. To prevent complex illustration, FIG. 5 illustrates only a configuration around a transmission side digital signal processing unit 202 of this invention.

In this embodiment, the transmission side digital signal processing unit 202 of this invention includes two systems, namely, an encoder exclusive for a single polarization state (X polarization) and an encoder exclusive for a polarization multiplexing state, and switches those two systems to save power.

X-polarization transmission information signals 204-1 and 204-2 and a Y-polarization transmission information signal 205 are output from the above-mentioned information signal splitter 203. The X-polarization transmission information signal 204-1 is passed through an X-polarization power saving framer 272, an X-polarization power saving error correction code generator 270, and an X-polarization power saving multilevel encoder 274, and an X-polarization output digital signal 110-1 is output from an X-polarization power saving pre-equalizing circuit 276 to be input to a subsequent transmission multilevel signal selection circuit 279. An X-polarization transmission information signal 204-2 and a Y-polarization transmission information signal 205 are passed as a set of signals through a polarization multiplexing power saving framer 273, a polarization multiplexing power saving error correction code generator 271, and a polarization multiplexing power saving multilevel encoder 275, and a polarization multiplexing digital signal 2781 is output from a polarization multiplexing power saving pre-equalizing circuit 277 to be similarly input to the subsequent transmission multilevel signal selection circuit 279.

A transmission side single polarization state selection signal 280 and a transmission side polarization multiplexing state selection signal 281 are output from a transmission side polarization state control unit 214. The transmission side single polarization state selection signal 280 and the transmission side polarization multiplexing state selection signal 281 are controlled so that one of the signals can be turned ON. When the transmission side single polarization state selection signal 280 is turned ON, an X-polarization signal processing circuit to which this signal is input is operated, and a polarization multiplexing processing circuit to which the transmission side polarization multiplexing state selection signal 281 is input transitions to a power saving mode. At the same time, the information signal splitter 203 and the transmission multilevel signal selection circuit 279 are switched to an X-polarization side. As a result, in a transmission side single polarization state, an operation of the polarization multiplexing circuit having a large circuit size is stopped, and power can be saved by utilizing only a transmission processing circuit of the X-polarization side having an approximately ½ size. In a transmission side polarization multiplexing state, switching is executed to conversely operate the transmission processing circuit exclusive for polarization multiplexing.

This embodiment is similar to the first embodiment of FIG. 1 in size of the simultaneously operated circuits while the circuit size is larger by 1.5 times, and accordingly the same power saving effect as that of the first embodiment can be provided. An advantage of this embodiment is that the exclusive framing and error correction circuits can be respectively used in the transmission side polarization multiplexing state and the transmission side single polarization state, and both polarized signals can be processed as a single transmission channel.

If the X-polarized and Y-polarized signals can be combined and processed as a single channel having a band twice as large, such combined signal is advantageous in transmission efficiency and management. However, frame configurations and error correction code arrangements are greatly different between the single polarization state and the polarization multiplexing state. As a result, it is difficult to achieve the single polarization state and the polarization multiplexing state by sharing a single framer or error correction circuit, and it is further difficult to stop an operation of the half circuit when the state is switched to the single polarization state. According to this embodiment, however, the X-polarized and Y-polarized signals can be combined and processed as a single channel having a band twice as large with a simple configuration.

As described above, according to the third embodiment, power consumption can be reduced in the transmission impairment compensators of not only the reception side where the power consumption is large but also the transmission side.

<Fourth Embodiment>

Figure 6:
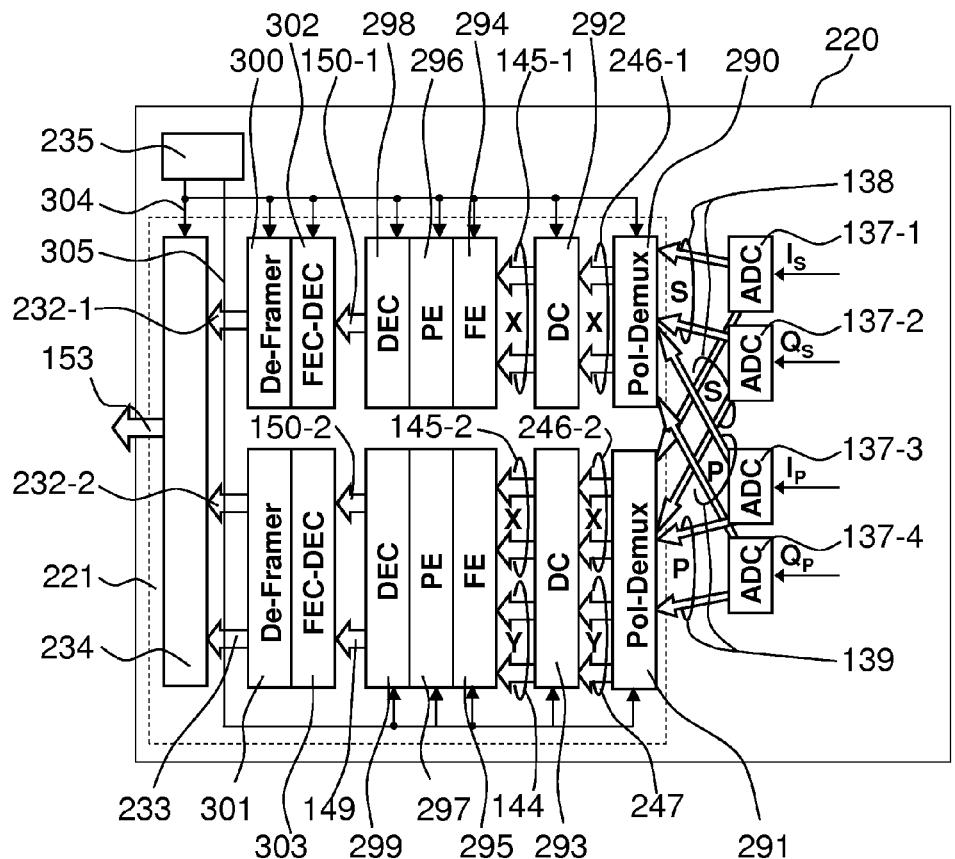
FIG. 6 is a diagram illustrating a configuration of a polarization multiplexing optical receiver according to a fourth embodiment of this invention.

FIG. 6 is a diagram illustrating a configuration of a polarization multiplexing optical receiver according to a fourth embodiment of this invention.

In the fourth embodiment, as in the case of the third embodiment, power is saved by providing a signal reconstruction circuit exclusive for a single polarization state and a signal reconstruction circuit exclusive for a polarization multiplexing state.

In this embodiment, S-polarization and P-polarization received digital signals 138 and 139 output from AD converters 137-1 to 137-4 are respectively input to an X-polarization power saving polarization component extraction circuit 290 and a polarization multiplexing power saving polarization component extraction circuit 291. An X-polarization received digital signal 246-1 output from the former X-polarization power saving polarization component extraction circuit 290 is sequentially processed at an X-polarization power saving transmission impairment compensator 292, an X-polarization power saving frequency offset estimation circuit 294, an X-polarization power saving phase estimation circuit 296, an X-polarization power saving multilevel decision circuit 298, an X-polarization power saving error correction circuit 302, and an X-polarization power saving frame removing circuit 300, and then input as an X-polarization received information signal 232-1 to an information signal coupling unit 234.

X-polarization and Y-polarization received digital signals 246-2 and 247 are output as a set from the polarization multiplexing power saving polarization component extraction circuit 291. Those signals are processed at a polarization multiplexing power saving transmission impairment compensator 293, a polarization multiplexing power saving frequency offset estimation circuit 295, a polarization multiplexing power saving phase estimation circuit 297, a polarization multiplexing power saving multilevel decision circuit 299, a polarization multiplexing power saving error correction circuit 303, and a polarization multiplexing power saving frame removing circuit 301, and then input as X-polarization and Y-polarization received information signals 232-2 and 233 to the information signal coupling unit 234.

A reception side single polarization state selection signal 304 and a reception side polarization multiplexing state selection signal 305 are output from a reception side polarization state control unit 235. The reception side single polarization state selection signal 304 and the reception side polarization multiplexing state selection signal 305 are controlled so that one of the signals can be turned ON. When the reception side single polarization state selection signal 304 is turned ON, an X-polarization signal processing circuit to which this signal is input is operated, and a polarization multiplexing processing circuit to which the reception side polarization multiplexing state selection signal 305 is input transitions to a power saving mode. At the same time, the information signal coupling unit 234 executes switching so that the X-polarization received information signal 232-1 is output. As a result, in a reception side single polarization state, an operation of the polarization multiplexing reception circuit having a large circuit size is stopped, and power can be saved by utilizing only a reception processing circuit of the X-polarization side having an approximately ½ size. In a reception side polarization multiplexing state, switching is executed to conversely operate the processing circuit exclusive for polarization multiplexing.

In the configuration of this embodiment, as in the case of the third embodiment, by switching between the processing circuit exclusive for single polarization and the processing circuit exclusive for polarization multiplexing, the respective exclusive framers or error correction circuits can be utilized, and both polarized signals can be processed as a single transmission channel. Operation switching of the error correction circuit and the framer and power saving can be easily achieved.

Figure 7:
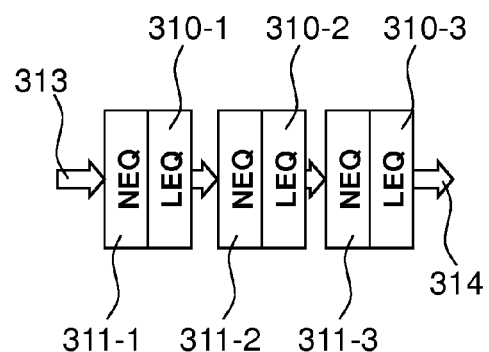
FIG. 7 is a diagram illustrating a configuration of the transmission impairment compensator according to the fourth embodiment of this invention.

FIG. 7 is a diagram illustrating a configuration of the transmission impairment compensator according to the fourth embodiment of this invention. In particular, FIG. 7 illustrates a configuration example for achieving equalization with a multistage configuration.

A most representative cause of transmission impairment in optical fiber transmission to which this invention is applied is chromatic dispersion of an optical transmission line. The chromatic dispersion is linear degradation, and can be relatively easily equalized by a complex FIR filter, a linear equalizer such as a frequency region equalizer, or a one-stage equalizer using a lookup table. The transmission impairment compensator consumes relatively more power than other circuits even in the one-stage configuration. In the case of the multistage configuration illustrated in FIG. 7, several to several tens of more power may be consumed.

In FIG. 7, an input complex digital signal (single polarization or polarization multiplexing) 313 is alternately subjected to degradation compensation at nonlinear compensators 311-1, 311-2, and 311-3 and chromatic dispersion compensators 310-1, 310-2, and 310-3, and then output as an output complex digital signal (single polarization or polarization multiplexing) 314. The nonlinear compensator compensates for transmission impairment such as self-phase modulation or cross-phase modulation between polarized signals that is an optical fiber nonlinear effect, and cross-phase modulation from another closer channel. As the number of repetitive stages increases, equalizing effects are higher and transmission quality can be improved. This embodiment is greatly effective when power consumption is large.

As described above, according to the fourth embodiment, the transmission impairment compensator for compensating for at least one of the chromatic dispersion and the nonlinearity of the optical fiber is provided. As a result, power consumption in long-distance transmission can be reduced.

The transmission impairment compensator on the transmission side or the reception side described above has the function of compensating for one or both of the chromatic dispersion and the nonlinearity of the optical fiber to be the transmission line for the received optical signal, or has the function of compensating for both thereof. Thus, the signals can be transmitted by a long distance, which can achieve effective power saving.

<Fifth Embodiment>

Figure 8:
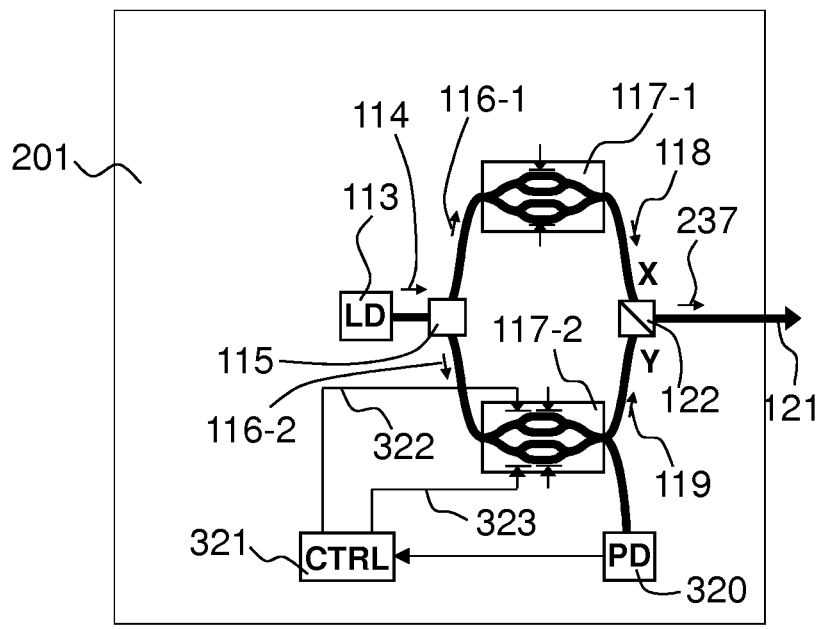
FIG. 8 is a diagram illustrating a configuration of a polarization multiplexing optical transceiver according to a fifth embodiment of this invention.
Figure 9:
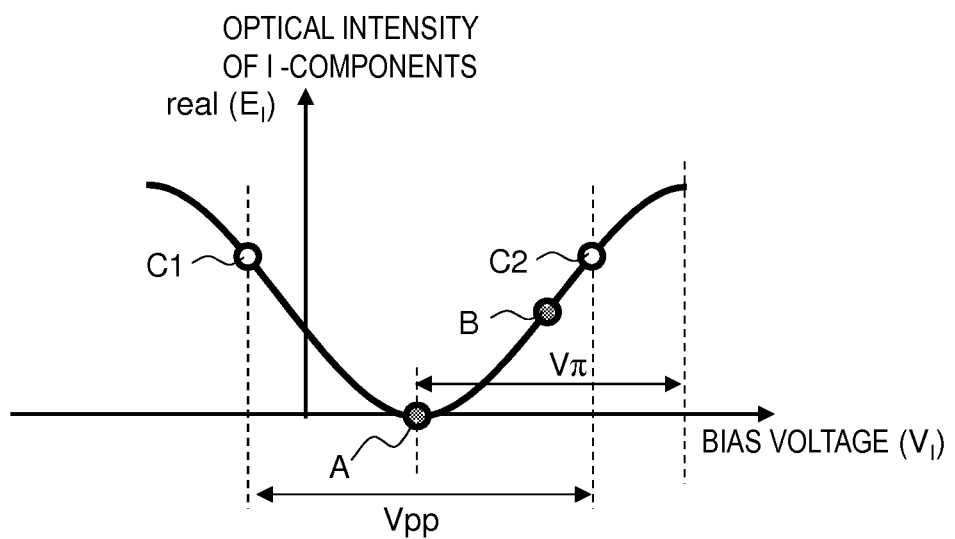
FIG. 9 is a diagram illustrating a principle of optical intensity control according to the fifth embodiment of this invention.

FIG. 8 is a diagram illustrating a configuration of a polarization multiplexing optical transceiver according to a fifth embodiment of this invention. FIG. 9 is a diagram illustrating a principle of optical intensity control according to the fifth embodiment of this invention.

In this embodiment, an optical intensity control mechanism at modulation stop time for a Y-polarization component modulation-stopped during single polarization transmission is provided to prevent degradation of transmission performance.

In FIG. 8, an optical detector 320 is disposed in an output part of an IQ optical field modulator 117-2 of a Y-polarization component, and an output signal of the optical detector 320 is input to a bias control circuit 321. The bias control circuit 321 outputs an I electrode bias control signal 322 and a Q electrode bias control signal 323, and can arbitrarily change operation points of two sets of MZ optical modulators arranged in the IQ optical field modulator 117-2.

The above-mentioned bias control circuit is widely used for controlling a bias point generally during modulation of the IQ optical field modulator 117-2. In this embodiment, an operation during no modulation is defined, and the same circuit can be shared in principle.

FIG. 9 shows an intensity change of an optical signal with respect to a bias voltage of an I-component. For a Q-component, FIG. 9 shows the same intensity change in principle. Normally, when the I and Q components are modulated, a modulation center point is A where optical intensity is zero. Assuming that a modulation signal is a binary signal, when a voltage amplitude is approximately Vpp, modulation symbols are two points of C1 and C2 of FIG. 9.

When the modulation is stopped in this state, a bias point is first near the point A where optical intensity is approximately zero. Thereafter, however, an operation of the bias control circuit 321 during a modulation stop is not defined. Thus, the bias point may fluctuate, or output intensity of the IQ optical field modulator 117-2 may be unstable.

In this embodiment, control is executed during modulation stop to change the operation of the bias control circuit 321 and roughly match the output intensity of the IQ optical field modulator 117-2 with that of the IQ optical field modulator 117-2 during modulation. In this case, a bias of at least one of the I and Q components may be controlled. As a result, a bias point moves to a point where optical intensity is sufficiently large, for example, a point B. Through this control, output optical intensity can be constant in both the polarization multiplexing state and the single polarization state, and intensity on a side (X-polarization) where modulation state is not changed can be maintained at a constant value without any change. As a result, instantaneous interruption with the optical signal caused by surging of an optical amplifier or a transient response can be prevented, and an increase of an optical fiber nonlinear effect caused by a change of the optical intensity can be prevented. Such control is a very important feature for preventing transmission impairment in a wavelength multiplexing transmission system that uses a wavelength selection switch, an automatic attenuator, a constant output control optical amplifier, or the like for keeping constant optical intensity of each wavelength.

As another useful control method, control may be executed to set an optical output zero so as to prevent generation of any residual light during the modulation stop, namely, to keep a position of a signal point at the point A. Such control is effective for optical transmission of a relatively short distance where not many optical amplifiers are present, and can improve transmission quality. Moreover, a position of the bias point is always kept fixed (extinction point), and thus the state can be quickly switched between the transmission side polarization multiplexing state and the transmission side single polarization state.

As described above, according to the fifth embodiment, degradation of the signal due to a change in optical intensity when the state is switched between the polarization multiplexing state and the single polarization state can be prevented, and sensitivity in the single polarization state can be improved.

<Sixth Embodiment>

Figure 10:
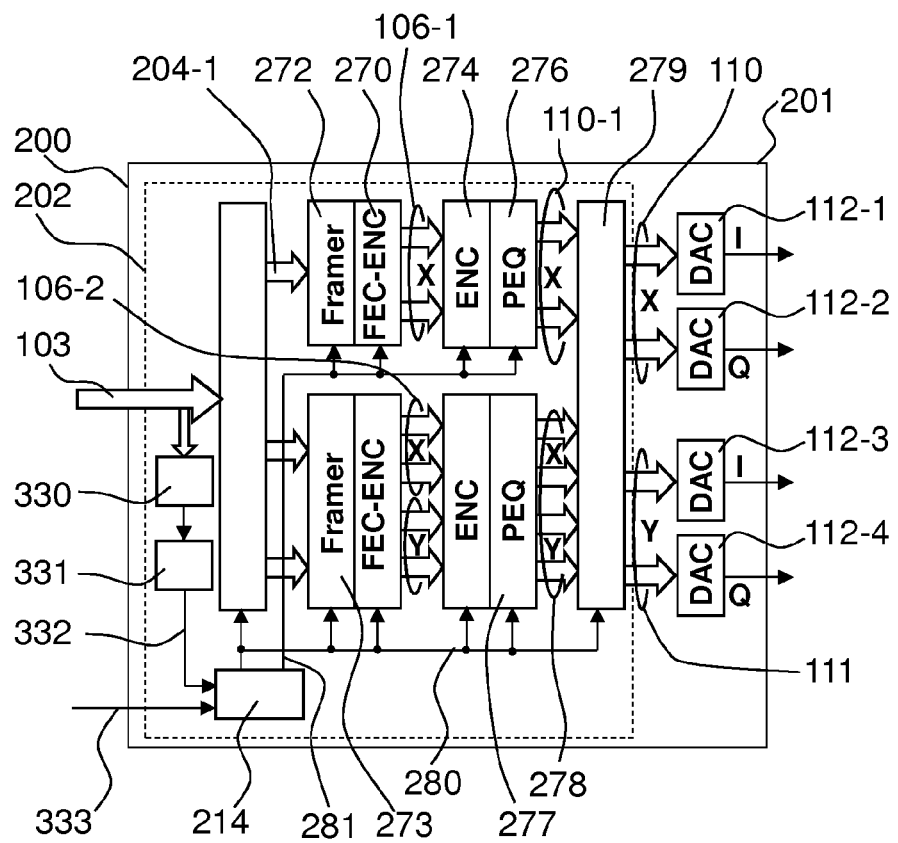
FIG. 10 is a diagram illustrating a configuration of a polarization multiplexing optical transceiver according to a sixth embodiment of this invention.

FIG. 10 is a diagram illustrating a configuration of a polarization multiplexing optical transceiver according to a sixth embodiment of this invention, where control of a transmission side polarization multiplexing state is automated.

In this embodiment, a part of a transmission information signal 103 input to a polarization multiplexing optical transceiver 201 is input to a transmission information amount detector 330, and an output signal of the transmission information amount detector 330 is input to an information amount threshold value decision circuit 331.

The information amount threshold value decision circuit 331 is a hysteresis decision circuit having two threshold values. For example, a first threshold value is set to 90% of an information amount permitted to be transmitted in a single polarization state, and a second threshold value is set to 70% of the information amount permitted to be transmitted in the single polarization state. The information amount threshold value decision circuit 331 executes control to turn on a polarization multiplexing state automatic switching signal 322 when an average transmission information amount exceeds the first threshold value, and turn off the polarization multiplexing state automatic switching signal 322 when the average transmission information amount is below the second threshold value.

The polarization multiplexing state automatic switching signal 322 is input to a transmission side polarization state control unit 214. The transmission side polarization state control unit 214 transitions to a transmission side polarization multiplexing state when the polarization multiplexing state automatic switching signal 322 is ON, and to the single polarization state when OFF.

Thus, a transmission traffic amount is sufficiently large, and automatic control for automatically switching to polarization multiplexing transmission only when transmission in the single polarization state is difficult can be achieved. A polarization multiplexing state manual switching signal 333 is also input to the transmission side polarization state control unit 214. When necessary, an operation state may be manually designated, and used in a fixed manner.

As described above, according to the sixth embodiment, the state is manually or automatically switched between the polarization multiplexing state and the single polarization state depending on the information amount to be transmitted. As a result, power can be effectively saved, and practicality can be improved.

<Seventh Embodiment>

Figure 11:
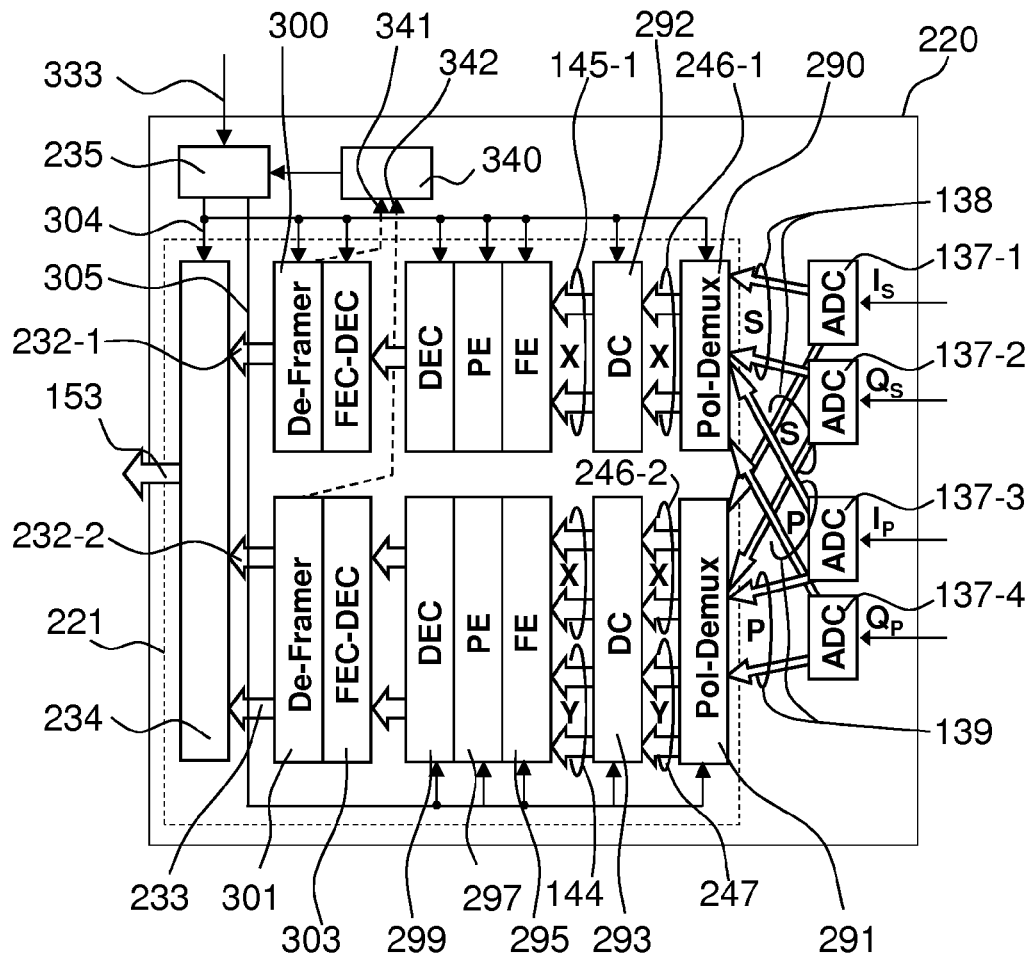
FIG. 11 is a diagram illustrating a configuration of a polarization multiplexing optical receiver according to a seventh embodiment of this invention.

FIG. 11 is a diagram illustrating a configuration of a polarization multiplexing optical receiver according to a seventh embodiment of this invention, where a state is automatically switched between a polarization multiplexing state and a single polarization state in accordance with a polarization state of a received signal.

According to this embodiment, an X-polarization power saving frame removing circuit 300 and a polarization multiplexing power saving frame removing circuit 301 detect changes in polarization multiplexing state, and respectively output a polarization multiplexing state switching signal 341 and a single polarization state switching signal 342. The output signals are input to a polarization multiplexing state decision circuit 340.

According to this embodiment, transition of a polarization state is written in an information header by a framer in an opposite transmission side digital signal processing unit, and notified to a reception side. For example, the polarization multiplexing optical transceiver illustrated in FIG. 10 is disposed to be opposed to the polarization multiplexing optical receiver illustrated in FIG. 11. In a transmission side polarization multiplexing state, the polarization multiplexing power saving framer 273 illustrated in FIG. 10 is in operation, and an event such as manual command or reduction of transmission information occurs. When changing to a single polarization state, transition information about presence/absence of state transition or transition timing (e.g., transition after N frames) is written in a header, and notified to the polarization multiplexing optical receiver.

On a reception side, the currently operated polarization multiplexing power saving frame removing circuit 301 notifies, after detecting the transition information to the single polarization state, the polarization multiplexing state decision circuit 340 of the detected transition information as the single polarization state switching signal 342. The polarization multiplexing state decision circuit 340 activates a currently stopped single polarization side signal processor before switching, switches an information signal coupling unit at timing designated to prevent instantaneous interruption with an information signal, and stops a polarization multiplexing side signal processor that has become unnecessary after the switching. Switching from the single polarization state to the polarization multiplexing state may be performed by a reverse procedure.

As described above, according to the seventh embodiment, there is no need to notify the reception side of the polarization state during activation of the transceiver. The polarization state can be reliably set on the reception side.

What is claimed is:

1. A polarization multiplexing optical transceiver configured to transmit/receive polarization multiplexed light, the polarization multiplexing optical transceiver comprising:
    a polarization multiplexing optical transmitter configured to transmit the polarization multiplexed light as an output optical signal having orthogonal polarization components;
    a polarization multiplexing optical receiver configured to receive the polarization multiplexed light as a received optical signal; and
    a transmission side polarization state control unit and a reception side polarization state control unit that are configured to operate independently of each other,
    wherein the transmission side polarization state control unit is configured to switch, for the polarization multiplexed light to be transmitted by the polarization multiplexing optical transmitter, the polarization multiplexing optical transmitter to one of a polarization multiplexing transmission state in which both of the polarization components of the output optical signal have been modulated by respective independent multilevel signals and the output optical signal is multiplexed, and a single polarization transmission state in which only one of the polarization components of the output optical signal has been modulated by the independent multilevel information signals, wherein the reception side polarization state control unit is configured to switch, for the polarization multiplexed light to be received by the polarization multiplexing optical receiver, the polarization multiplexing optical receiver to one of a polarization multiplexing reception state in which both of the polarization components of the received optical signal have been modulated by the respective independent multilevel information signals and multiplexed, and a single polarization reception state in which only one of the polarization components of the received optical signal has been modulated by the independent multilevel information signals, wherein the polarization multiplexing optical receiver includes:
a polarization demultiplexing unit configured to reconstruct orthogonal polarization components at a transmission side from the received optical signal,
a plurality of information signal reconstruction units configured to receive the reconstructed polarization components from the polarization demultiplexing unit, and reconstruct and extract information signals therefrom, and
an information signal coupling unit configured to select the extracted information signals output by the plurality of information signal reconstruction units and output a result thereof under control of the reception side polarization state control unit, and wherein the polarization multiplexing optical receiver is further configured to control, when in the single polarization reception state, the polarization demultiplexing unit and at least one of the plurality of information signal reconstruction units to transition to a power saving mode.

2. The polarization multiplexing optical transceiver according to claim 1,
wherein the polarization multiplexing optical receiver further includes:
a reception front end configured to convert the received optical signal into a serial electric signal;
an AD converter configured to convert the serial electric signal into a digital signal; and
a reception side digital signal processing unit configured to subject the digital signal to multilevel demodulation to execute signal processing, and
wherein the reception side digital signal processing unit includes the polarization demultiplexing unit, the plurality of information signal reconstruction units, and the information signal coupling unit.

3. The polarization multiplexing optical transceiver according to claim 1,
wherein the plurality of information signal reconstruction units each includes at least one of a reception side transmission impairment compensator configured to compensate for linear/nonlinear degradation of a transmission line or an error correction unit configured to correct a signal error of the received optical signal, and
wherein each of the reception side transmission impairment compensator and the error correction unit transitions to the power saving mode under the control of the reception side polarization state control unit.

4. The polarization multiplexing optical transceiver according to claim 1, wherein the polarization multiplexing optical receiver includes a reception side transmission impairment compensator configured to compensate for linear degradation and nonlinear degradation of a transmission line, and extracts, from a subsequent circuit of the reception side transmission impairment compensator, an optimization control signal to be input to the polarization demultiplexing unit.

5. The polarization multiplexing optical transceiver according to claim 1, wherein the polarization multiplexing optical transmitter includes a transmission side transmission impairment compensator configured to transition to the power saving mode under control of the transmission side polarization state control unit.

6. The polarization multiplexing optical transceiver according to claim 3, wherein at least one of the transmission side transmission impairment compensator or the reception side transmission impairment compensator compensates for at least one of chromatic dispersion or nonlinearity of an optical fiber through which the received optical signal is transmitted.

7. The polarization multiplexing optical transceiver according to claim 1, wherein the polarization multiplexing optical transmitter executes control so that an average intensity of the polarization components not modulated by the independent multilevel information signals in the single polarization transmission state becomes equal to an average intensity of the polarization components modulated by the respective independent multilevel information signals in the polarization multiplexing transmission state.

8. The polarization multiplexing optical transceiver according to claim 1, wherein the polarization multiplexing optical transmitter executes control so that an average intensity of the polarization components not modulated by the independent multilevel information signals becomes zero in the single polarization transmission state.

9. The polarization multiplexing optical transceiver according to claim 1, wherein the transmission side polarization state control unit and the reception side polarization state control unit each switches control in response to one of an inputted external signal and an external operation.

10. The polarization multiplexing optical transceiver according to claim 1, further comprising:
a transmission information amount measurement unit configured to measure an average transmission information amount of the extracted information signals,
wherein the transmission side polarization state control unit stores a first predetermined threshold value and a second predetermined threshold value equal to or smaller than the first predetermined threshold value, and
wherein the transmission side polarization state control unit controls the polarization multiplexing optical transmitter to switch to the polarization multiplexing transmission state when the measured average transmission information amount exceeds the first predetermined threshold value, and to switch to the single polarization transmission state when the measured average transmission information amount falls below the second threshold value.

11. The polarization multiplexing optical transceiver according to claim 1, wherein the reception side polarization state control unit switches control based on one of a polarization multiplexed state of the received optical signal and polarization state switching information included in the received optical signal.

12. A polarization multiplexing optical transmission/reception system, comprising:
two opposing polarization multiplexing optical transceivers which are each configured to transmit/receive polarization multiplexed light,
wherein each of the polarization multiplexing optical transceivers includes:
a polarization multiplexing optical transmitter configured to transmit the polarization multiplexed light as an output optical signal having orthogonal polarization components;
a polarization multiplexing optical receiver configured to receive the polarization multiplexed light as a received optical signal; and
a transmission side polarization state control unit and a reception side polarization state control unit that are configured to operate independently of each other,
wherein the transmission side polarization state control unit is configured to switch, for the polarization multiplexed light to be transmitted by the polarization multiplexing optical transmitter, the polarization multiplexing optical transmitter to one of a polarization multiplexing transmission state in which both of the polarization components of the output optical signal have been modulated by respective independent multilevel signals and the output optical signal is multiplexed, and a single polarization transmission state in which only one of the polarization components of the output optical signal has been modulated by the independent multilevel information signals, and
wherein the reception side polarization state control unit is configured to switch, for the polarization multiplexed light to be received by the polarization multiplexing optical receiver, the polarization multiplexing optical receiver to one of a polarization multiplexing reception state for receiving polarization multiplexed light in which both of the polarization components have been modulated by the respective independent multilevel information signals and a single polarization reception state for receiving single polarized light in which only one of the polarization components has been modulated by one of the independent multilevel information signals in cooperation with the polarization multiplexing optical transceiver of the opposite polarization multiplexing optical transceiver,
wherein, in each of the polarization multiplexing optical transceivers, the polarization multiplexing optical receiver includes:
a polarization demultiplexing unit configured to reconstruct orthogonal polarization components at a transmission side from the received optical signal;
a plurality of information signal reconstruction units configured to receive the reconstructed polarization components from the polarization demultiplexing unit, and reconstruct and extract information signals therefrom, and
an information signal coupling unit configured to select the extracted information signals output by the plurality of information signal reconstruction units and output a result thereof under control of the reception side polarization state control unit, and wherein the polarization multiplexing optical receiver is further configured to control, when in the single polarization reception state, the polarization demultiplexing unit and at least one of the plurality of information signal reconstruction units to transition to a power saving mode.

13. A polarization state switching method for a polarization multiplexing optical transceiver configured to transmit/receive polarization multiplexed light,
wherein the polarization multiplexing optical transceiver includes: a polarization multiplexing optical transmitter configured to transmit the polarization multiplexed light; as an output optical signal having orthogonal polarization components, a polarization multiplexing optical receiver configured to receive the polarization multiplexed light as a received optical signal, and a transmission side polarization state control unit and a reception side polarization state control unit that are configured to operate independently of each other, and
wherein the polarization multiplexing optical receiver includes: a polarization demultiplexing unit configured to reconstruct orthogonal polarization components at a transmission side from the received optical signal, a plurality of information signal reconstruction units configured to receive the reconstructed polarization components from the polarization demultiplexing unit, and reconstruct and extract information signals therefrom, and an information signal coupling unit configured to select the extracted information signals output by the plurality of information signal reconstruction units and output a result thereof under control of the reception side polarization state control unit,
the polarization state switching method comprising:
switching, by the transmission side polarization state control unit, for the polarization multiplexed light to be transmitted by the polarization multiplexing optical transmitter, the polarization multiplexing optical transmitter to one of a polarization multiplexing transmission state in which both of the polarization components of the output optical signal have been modulated by respective independent multilevel signals and the output optical signal is multiplexed, and a single polarization transmission state in which only one of the polarization components of the output optical signal has been modulated by the independent multilevel information signals;
switching, by the reception side polarization state control unit, for the polarization multiplexed light to be received by the polarization multiplexing optical receiver, the polarization multiplexing optical receiver to one of a polarization multiplexing reception state in which both of the polarization components of the received optical signal have been modulated by the respective independent multilevel information signals and multiplexed and a single polarization reception state in which only one of the polarization components of the received optical signal has been modulated by the independent multilevel information signals; and
changing, by the polarization multiplexing optical receiver in the single polarization reception state, the polarization demultiplexing unit and at least one of the plurality of information signal reconstruction units to a power saving mode.

* * * * *